United States Patent
Panjala et al.

(10) Patent No.: US 7,575,689 B1
(45) Date of Patent: Aug. 18, 2009

(54) NAPHTHENIC ACID REMOVAL PROCESS

(75) Inventors: Devadas Panjala, Bartlesville, OK (US);
Joseph B. Cross, Bartlesville, OK (US);
Larry E. Reed, Bartlesville, OK (US);
Charles J. Lord, III, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/237,430

(22) Filed: Sep. 25, 2008

(51) Int. Cl.
*C02F 1/00* (2006.01)
(52) U.S. Cl. .................. 210/694; 210/909; 210/912
(58) Field of Classification Search ................ 210/694, 210/909, 912
See application file for complete search history.

(56) References Cited

U.S. PATENT DOCUMENTS

| | | | |
|---|---|---|---|
| 3,457,165 | A | 7/1969 | Urban |
| 4,839,054 | A | 6/1989 | Ruebush et al. |
| 5,104,545 | A | 4/1992 | Means et al. |
| 5,395,536 | A | 3/1995 | Brown et al. |
| 5,601,721 | A | 2/1997 | Lukasiewicz et al. |
| 7,112,280 | B2 | 9/2006 | Hughes et al. |
| 7,282,152 | B2 | 10/2007 | Dubrovsky |
| 2004/0168973 | A1 | 9/2004 | Hughes et al. |
| 2005/0079114 | A1* | 4/2005 | Dubrovsky ................. 423/1 |
| 2009/0057236 | A1* | 3/2009 | Sanchez et al. ............ 210/724 |

* cited by examiner

*Primary Examiner*—Chester T Barry

(57) ABSTRACT

A process for removing naphthenic acids from an aqueous stream using a composition comprising calcium and activated carbon, and optionally a process for removing naphthenic acid and selenium compounds from an aqueous stream, is disclosed.

24 Claims, No Drawings

NAPHTHENIC ACID REMOVAL PROCESS

The invention relates to an improved process for removing naphthenic acids from a water stream. More particularly, the invention relates to the use of a composition containing calcium and activated carbon for the removal of naphthenic acids from a water stream.

SUMMARY OF THE INVENTION

In accordance with this invention, a process for removing naphthenic acids from a water stream is provided which comprises contacting a feed stream comprising water, naphthenic acids and a selenium compound with a composition comprising calcium and activated carbon for removal of at least a portion of the naphthenic acids from the feed stream thereby forming a treated stream comprising less naphthenic acids than the feed stream.

DETAILED DESCRIPTION OF THE INVENTION

The feed stream of the current invention can be any aqueous stream containing naphthenic acids and one or more selenium compounds from a source such as, but not limited to, a petroleum refinery, or a mining operation, or the runoff from an irrigation stream which has contacted naphthenic acids and selenium containing soil, or a power plant and is most typically a wastewater stream, also referred to herein as a feed stream, from a petroleum refinery. The wastewater stream typically comprises water, naphthenic acids and one or more selenium compounds. The naphthenic acid is typically selected from the group consisting of distillate range naphthenic acids, including phenols and glycols. The naphthenic acid preferably has the formula $C_nH_{2n-z}O_2$; wherein z=0, 2, 4, 6, 8, 10, or 12; and wherein n ranges from 6 to 46. More preferably, n ranges from 10 to 24 and most preferably n ranges from 14 to 22. These naphthenic acids can be alkyl, aryl, aliphatic or aromatic molecules and, if aromatic, can have from one to six aromatic rings, including naphthene, with either carbonyl and/or alcohol functional groups.

The selenium compound in the wastewater stream is typically selected from the group consisting of selenite, selenocyanate, selenate, hydrogen selenide, selenium, and combinations thereof. The wastewater stream typically comprises at least about 3000 ppb, by weight, selenium, more typically at least about 1000 ppb selenium, on an elemental selenium basis. The wastewater stream can also comprise, consist of, or consist essentially of water, selenium compounds and contaminants selected from the group consisting of thiosulfate, thiocyanate, chloride, sulfate, sulfite, hydrogen sulfide, organics, phenolics, and combinations thereof.

The feed, or wastewater, stream is contacted with a composition comprising, consisting of, or consisting essentially of, calcium and activated carbon for removal of at least a portion of the naphthenic acids from the feed stream thereby forming a treated stream comprising less naphthenic acids than the feed stream. Any form of calcium can be used, however preferably calcium in the form of calcium salt. Exemplary calcium salts include, but are not limited to, calcium nitrate, calcium sulfate, calcium chloride, and combinations of one or more thereof. Usually, the calcium salt is used as an aqueous solution and comprises about 30 to about 40, preferably 20 to 30, and most preferably, 10 to 20 weight percent calcium, as calcium, in the aqueous solution.

The activated carbon can be any activated carbon. As used in this disclosure, activated carbon is any carbon material that has a surface area of greater than about 300 $m^2$/gram, preferably greater than about 400 $m^2$/gram and most preferably greater than 500 $m^2$/gram, as determined by BET nitrogen adsorption. The activated carbon can be in any available form, such as for example, granules, extrudates, pellets, and combinations of two or more thereof. Granulated activated carbon, if used, usually has a particle size within the range of 20 to 40 mesh; pelleted activated carbon, if used, usually has a diameter within a range of about 0.9 to about 2 mm diameter and about 3 to about 4 mm length. Commercially available activated carbon can be used. Known commercial activated carbon suppliers include, but are not limited to, Nucon International, Inc.; Calgon Carbon Corporation; Siemens Water Technologies, Cameron Carbon, Inc.; Norit Americas, Inc.; General Carbon Corporation; Carbochem Inc.; and Prominent Systems, Inc.

The feed stream is contacted with a sufficient quantity of the composition such that the treated stream contains less than or equal to about 30 weight percent, preferably less than or equal to about 20 weight percent, most preferably less than or equal to about 5 weight percent, of the naphthenic acids contained in the feed stream, on a molar basis.

The concentration of calcium, as elemental, i.e., ionic, calcium, in the composition is in the range of from about 1 to about 60 weight percent, preferably from about 10 to about 30 weight percent, based on the weight of the total composition.

The temperature at which the feed stream is contacted with the composition is in the range of from about 20° C. to about 100° C., preferably from about 30° C. to about 80° C.

The contacting can occur under any atmosphere, preferably a non-oxidizing atmosphere, and for ease of use, the preferred atmosphere is air. The contacting can be at any pressure, and for ease of use, preferably at atmospheric pressure.

After treatment of the feed stream with the composition, the resultant treated stream, having reduced naphthenic acid content, can be contacted with a second composition to remove selenium from the treated stream.

When at least about 70 weight percent, preferably at least about 80 weight percent, on an elemental selenium basis, of the selenium compound in the treated stream is selenite, the contacting with the second composition is preferably in the presence of an activating agent.

The activating agent can be selected from the group consisting of ammonium sulfite, sodium sulfite, potassium sulfite, $H_2SO_3$, sulfur dioxide, and combinations thereof.

When at least about 70 weight percent, preferably at least about 80 weight percent, on an elemental selenium basis, of the selenium compound in the treated stream is selenocyanate, the treated stream preferably is contacted with the second composition at a pH between about 1 to about 8.5, and more preferably a pH between about 3 to about 5.

When at least about 70 weight percent, preferably at least about 80 weight percent, on an elemental selenium basis, of the selenium compound is selenocyanate, and when the treated stream is too basic, the pH can be adjusted by adding an acid selected from the group consisting of sulfuric acid, $SnCl_2$, $FeCl_2$, $AlCl_3$ and combinations thereof, prior to contacting the feed stream with the composition.

Further, when at least about 70 weight percent, preferably at least about 80 weight percent, on an elemental selenium basis, of the selenium compound is selenocyanate, the treated stream preferably comprises less than or equal to about 20 ppb, more preferably less than or equal to about 10 ppb, oxygen when contacted with the second composition.

When at least about 70 weight percent, preferably at least about 80 weight percent, on an elemental selenium basis, of the selenium compound is selenocyanate, and the treated stream further comprises a contaminant selected from the group consisting of thiosulfate, thiocyanate, chloride, sulfate, sulfite, organics, phenolics and combinations thereof, contacting with the second composition preferably is at a temperature in the range of from about 50° C. to about 100° C., more preferably from about 65° C. to about 100° C., and at a pH between about 2 to about 4, more preferably about 2 to about 3.

EXAMPLES

The following examples illustrate the effectiveness of the inventive process for removing naphthenic acids and naphthenic acids and selenium from an aqueous stream.

Example 1

Composition Preparation

Fifty grams (50 g) of two, different commercially available activated carbons were dried at a temperature of about 150° C. for a time of 4 hours. The two, different commercially activated carbons were Nusorb®, available from Nucon International, Inc. and CarbSorb 30®, available from Calgon Carbon Corporation.

A 30 weight percent aqueous solution of calcium nitrate was prepared by dissolving 30 grams dried calcium nitrate in 100 grams water. Then, a sufficient amount of the aqueous calcium nitrate solution was added to the dried, activated carbon, to be equal to or less than incipient wetness. Water was removed and the resultant particulate was dried under air, at ambient pressure, at 150° C., for 10 hours. The resultant, dried, calcium-impregnated, activated carbon comprised 25 weight percent calcium based on the total weight of the resultant compound.

Example 2

Preparation of Naphthenic Acid Stock Solution

An organic acid stock solution was prepared to emulate a refinery wastewater stream. This organic stock solution was prepared using organic extract collected from a refinery sour water stripper, which is jelly-like, aqueous emulsion. The jelly-like material mainly comprised naphthenic acids, glycols and phenols, specifically, both cyclic and acyclic ring structures comprising $C_5$ to $C_{25}$ per molecule, specifically $C_7$ to $C_{22}$ per molecule, and more specifically $C_7$ to $C_{10}$ carbon atoms per molecule. A one weight percent stock solution was prepared by mixing ten grams of the organic extract into one liter of distilled water. Different concentrations of naphthenic acid solutions were prepared from the stock solution in deionized water and the pH was adjusted to a pH of 12 with dilute (5%) sodium hydroxide solution. Ultrasonic microwaves were applied to the pH adjusted solutions for few minutes to disperse the organic extract in water and to produce homogeneous solution that was slightly basic nature. The total carbon of the stock solution total was measured in ppm, by weight, for both organic and inorganic carbon content and the results are shown in Table 1.

TABLE 1

| | ppm, by weight | |
| --- | --- | --- |
| Name | Organic Carbon | Inorganic Carbon |
| Refinery organic extract stock solution | 155 | 4 |

Example 3

Bottle Test

Bottle tests were conducted to evaluate various compositions for their naphthenic acid adsorption capabilities. Bottle tests were performed, instead of packed bed tests, in order to differentiate between sorption and filtration processes and eliminate possible contributions from a filtration process that may occur with a packed bed. Using a packed bed, the composition can act as filter as well as a sorbent to remove naphthenic acids.

The composition was added to a bottle containing stock solution and the composition was freely dispersed in solution. With this method, a known volume of the amount of organic compounds removal is due to exclusively from sorption process and eliminates possible naphthenic acid removal due to filtration. The bottle tests were conducted using a known volume and concentration of refinery extract stock solution in multiple bottles and known quantities of different compositions in each bottle. The carbon content was measured before and after sorption process and results are presented in the Table 2.

TABLE 2

| | ppm, by weight | |
| --- | --- | --- |
| Name | Organic Carbon | Inorganic Carbon |
| Refinery organic extract stock solution (from Example 2, Table 1) | 155 | 4 |
| Nusorb ® Activated Carbon | 14 | 12 |
| Calgon ® Activated Carbon | 13 | 21 |
| Calcium-Nusorb ® Activated Carbon | 0 | 4 |
| Drierite ® | 57 | 3 |

The data in Table 2 shows that use of a calcium-impregnated activated carbon provides best overall carbon removal.

Example 4 pH Adjustment in Presence of Contaminants

Aqueous selenium containing feeds, having the concentrations shown in Table 3, were contacted with a sulfur/carbon material (about 13 wt. % sulfur) obtained from Nucon International, Inc. referred to as MERSORB®-LW.

TABLE 3

| Feed | Thiocyanate (ppm) | Thiosulfate (ppm) | Selenocyanate (ppm) | Se Removal Efficiency after 20 hrs on stream (%) |
|---|---|---|---|---|
| 1 | 31 | 21 | 1.1 | ~22 |
| 2 | 31 | 21 | 1.1 | ~53 |
| 3 | 31 | 21 | 1.1 | ~74 |

The feedstream velocity was 3.0 GPM/ft.$^2$ with a LHSV of 29.3 hr.$^{-1}$. The temperature was about 70° C. and the particle size of the sulfur/carbon material was about 0.9 mm. For Feed #1 the pH was about 8.5 when contacted with the sulfur/carbon material. For Feed #2 the pH was lowered to about 2.5 prior to contact with the sulfur/carbon material using sulfuric acid. For Feed #3 stannous chloride was added to the feed stream to a concentration of about 100 ppm $SnCl_2$ prior to contact with the sulfur/carbon material.

As can be seen, the reduction of the pH of the feedstream had a significant impact on the selenium removal efficiency when the feedstream also contained thiocyanate and thiosulfate contaminants.

Example 5

A sample of a sour water stream was contacted with a sulfur/alumina material (about 20 wt. % sulfur) after addition of a quantity of ammonium sulfite. The sour water feed contained about 2010 ppb selenium.

The selenium concentrations of the treated stream are set out in Table 4 below.

TABLE 4

| Time on Stream | Se (ppb) |
|---|---|
| 1 hr | 39 |
| 2 hrs | 28 |
| 3 hrs | 27 |
| 4 hrs | 33 |
| 5 hrs | 41 |
| 6 hrs | 37 |
| 7 hrs | 19 |
| 8 hrs | 28 |
| 9 hrs | 28 |
| 10 hrs | 15 |

As can be seen from Table 4 above, the sulfur/alumina material proved effective in removing selenium from the sour water stream feed.

Example 6

An aqueous stream containing selenocyanate was contacted with a quantity of the sulfur/carbon material described in Example 4. The feed for Run 1 contained about 8.5 ppm oxygen and 3.0 ppm selenocyanate.

In Run 2, nitrogen was bubbled through the feed for Run 1 prior to contact with the sulfur/carbon material to lower the feed oxygen from about 8.5 ppm to about 0.02 ppm.

After 22 hours on stream, the selenium removal efficiency for Run 1 was about 54% while the selenium removal efficiency for Run 2 was about 98%. Thus, the removal of oxygen from a feed containing selenocyanate results in a significant increase in selenium removal.

Example 7

Run 1

An aqueous stream containing 3360 ppb selenocyanate was contacted with a quantity of the sulfur/carbon material of Example 4.

Run 2

An aqueous stream containing 3350 ppb selenocyanate was contacted with a quantity of a virgin carbon material obtained from Nucon International, Inc.

For each run, the velocity of the feed was 3 gpm/ft$^2$ and the temperature was 70° C.

The results of the runs are shown in Table 5 below.

TABLE 5

| Run 1 (Sulfur/Carbon) | | | Run 2 (Virgin Carbon) | | |
|---|---|---|---|---|---|
| Time On Stream (hrs) | Se (ppb) | % removed | Time On Stream (hrs) | Se (ppb) | % removed |
| 1 | 225 | 93.3 | 1 | 499 | 85.1 |
| 2 | 303 | 91.0 | 2 | 837 | 75.0 |
| 3 | 370 | 89.0 | 3 | 1250 | 62.7 |
| 4 | 435 | 87.1 | 4 | 1680 | 49.9 |
| 5 | 420 | 87.5 | 5 | 2070 | 38.2 |
| 6 | 439 | 86.9 | 6 | 2240 | 33.1 |
| 7 | 472 | 86.0 | 7 | 2370 | 29.3 |
| 8 | 503 | 85.0 | 8 | 2550 | 23.9 |

As can be seen from the above data in Table 5, the use of a sulfur/carbon material is significantly more effective in selenium removal as compared to virgin carbon.

Example 8

A sulfur/carbon material was prepared by admixing 15 grams of sulfur with 35 grams of Nuchar® virgin carbon obtained from MeadWestvaco Corporation.

The admixture was heated at a temperature between about 170° C. and about 213° C., with occasional mixing of the admixture, to form a sulfur/carbon material containing about 30 wt. % sulfur.

Quantities of an aqueous feed containing around 4000 ppb selenocyanate were separately contacted with a quantity of Nuchar® virgin carbon, with a quantity of virgin carbon obtained from Norit Americas, Inc., with the 30 wt. % sulfur/carbon material described above, and with the sulfur/carbon material of Example 4. Results of the runs are shown in Table 6 below.

TABLE 6

| Material | Se Removal Efficiency after 20 hrs. on stream (%) |
|---|---|
| Nuchar ® virgin carbon | ~1 |
| Norit virgin carbon | ~10 |
| 30 wt. % sulfur/carbon | ~26 |
| MERSORB ® - LW sulfur/carbon | ~84 |

As can be seen from Table 6, the sulfur/carbon materials provided much improved selenium removal as compared to virgin carbon.

Example 9

An aqueous feed containing 1000 ppb selenocyanate was contacted with a quantity of the 30% sulfur/carbon material of Example 8 at a LHSV of 1.0 hr$^{-1}$ and a temperature of 25° C., with and without the addition of ammonium sulfite. The selenium removal efficiency without ammonium sulfite addition was about 15% after about 20 hours on stream, while the selenium removal efficiency with ammonium sulfite addition was greater than 99% after about 20 hours on stream.

Thus, the addition of a sulfite to the aqueous feed, prior to contact with the sulfur/carbon material, can be effective in the removal of selenocyanate from such a stream under certain conditions.

Example 10

An aqueous feed containing 1000 ppb selenite was contacted with a quantity of the 30% sulfur/carbon material of Example 8 at a LHSV of 1.0 hr.$^{-1}$ and a temperature of 25° C., with and without the addition of ammonium sulfite. The selenium removal efficiency without ammonium sulfite addition was less than 1% after about 20 hours on stream, while the selenium removal efficiency with ammonium sulfite addition was about 99% after about 20 hours on stream.

Thus, the addition of a sulfite to the aqueous feed, prior to contact with the sulfur/carbon material, can be effective in the removal of selenite from such a stream.

Example 111

An aqueous stream containing 250 ppb selenium was contacted with several supported sulfur materials. Around 2 grams of sodium sulfite were added per liter of feed prior to contact with the supported sulfur materials. The flow rate was 100 ml/hr. with a LHSV of 1.7 and a temperature of about 21° C. The results are shown in Table 7 below.

TABLE 7

| Material | Se Removal Efficiency (%) | |
| --- | --- | --- |
| | After 2 hours on stream | After 4 hours on stream |
| 30% Sulfur on Pearlite/Alumina | 66.0 | 79.7 |
| 10% Sulfur on Carbon | 80.5 | 24.2 |
| 20% Sulfur on Carbon | 99.2 | 78.5 |
| 30% Sulfur on Carbon | >99.6 | 93.4 |

As can be seen from Table 7, supported sulfur materials are useful in removing selenium from an aqueous selenium stream.

Whereas this invention has been described in terms of the preferred embodiments, reasonable variations and modifications are possible by those skilled in the art. Such modifications are within the scope of the described invention and appended claims.

That which is claimed:

1. A process comprising contacting a feed stream comprising water, high molecular weight naphthenic acids and at least one selenium compound with a composition comprising a calcium-modified, activated carbon for removal of at least a portion of said high molecular weight naphthenic acids from said feed stream thereby forming a treated stream comprising less high molecular weight naphthenic acids than said feed stream.

2. The process of claim 1 wherein said calcium is a calcium salt.

3. The process of claim 1 wherein said calcium compound is selected from the group consisting of calcium nitrate, calcium sulfate, calcium chloride and mixtures thereof.

4. The process of claim 1 wherein said activated carbon has a surface area of greater than about 300 m$^2$/gram.

5. The process of claim 1 wherein said contacting is at a temperature in the range of from about 20° C. to about 100° C.

6. The process of claim 1 wherein said contacting is at a temperature in the range of from about 30° C. to about 80° C.

7. The process of claim 1 wherein said feed stream is contacted with a sufficient quantity of said composition such that said treated stream contains less than or equal to about 30 weight percent of the naphthenic acids contained in said feed stream, on a molar basis.

8. A process comprising
    a) contacting a feed stream comprising water, high molecular weight naphthenic acids and at least one selenium compound with a composition comprising a calcium-modified, activated carbon for removal of at least a portion of said high molecular weight naphthenic acids from said feed stream thereby forming an intermediate stream comprising less high molecular weight naphthenic acids than said feed stream; and
    b) contacting said intermediate stream with a second composition comprising sulfur and a porous support for removal of at least a portion of said selenium compound from said feed stream thereby forming a treated stream comprising less selenium than said feed stream.

9. The process of claim 8 wherein at least about 70 wt. %, on an elemental selenium basis, of said selenium compound is selenite and said contacting of said feed stream with said composition is in the presence of an activating agent.

10. The process of claim 8 wherein said activating agent is selected from the group consisting of ammonium sulfite, sodium sulfite, potassium sulfite, H$_2$SO$_3$, sulfur dioxide, and combinations thereof.

11. The process of claim 8 wherein said porous support is selected from the group consisting of an inorganic oxide, carbon and combinations thereof.

12. The process of claim 8 wherein said porous support is selected from the group consisting of alumina, carbon and combinations thereof.

13. The process of claim 8 wherein said porous support is carbon.

14. The process of claim 8 wherein said feed stream is contacted with a sufficient quantity of said first composition and said second composition such that said treated stream contains less than or equal to about 30 wt. % of the selenium contained in said feed stream, on an elemental selenium basis.

15. The process of claim 8 wherein said feed stream is contacted with a sufficient quantity of said first composition and said second composition such that said treated stream contains less than or equal to about 30 weight percent of the naphthenic acids contained in said feed stream, on a molar basis.

16. The process of claim 8 wherein the concentration of sulfur of said second composition is in the range of from about 1 to about 60 wt. % sulfur.

17. The process of claim 8 wherein said contacting is at a temperature in the range of from about 20° C. to about 100° C.

18. The process of claim 8 wherein at least about 70 wt. %, on an elemental selenium basis, of said selenium compound is selenocyanate.

19. The process of claim 8 wherein said contacting of said feed stream with said composition is at a pH between about 1 to about 8.5.

20. The process of claim 8 wherein an acid selected from the group consisting of sulfuric acid, $SnCl_2$, $FeCl_2$, $AlCl_3$, and combinations thereof, is added to said feed stream prior to said contacting with said first composition and said second composition.

21. The process of claim 8 wherein said feed stream comprises less than or equal to about 20 ppb oxygen when contacted with said first composition and said second composition.

22. The process of claim 8 wherein the concentration of sulfur of said first composition and said second composition is in the range of from about 1 to about 60 wt. % sulfur.

23. The process of claim 8 wherein said contacting is at a temperature in the range of from about 20° C. to about 100° C.

24. The process of claim 8 wherein said feed stream further comprises a contaminant selected from the group consisting of thiosulfate, thiocyanate, chloride, sulfate, sulfite, hydrogen sulfide, organics, phenolics and combinations thereof, and wherein said contacting is at a temperature in the range of from about 50° C. to about 100° C., and at a pH between about 2 to about 4.

* * * * *